United States Patent
Hsu et al.

(10) Patent No.: US 9,225,887 B1
(45) Date of Patent: Dec. 29, 2015

(54) IMAGE CAPTURING MODULE FOR REDUCING ASSEMBLY TILT

(71) Applicant: LARVIEW TECHNOLOGIES CORP., Taoyuan County (TW)

(72) Inventors: Po-Chih Hsu, Hsinchu County (TW); Chao-Yuan Chan, New Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 14/455,977

(22) Filed: Aug. 11, 2014

(51) Int. Cl.
*H04N 5/232* (2006.01)
*H04N 5/225* (2006.01)
*G03B 13/00* (2006.01)

(52) U.S. Cl.
CPC ........... *H04N 5/2254* (2013.01); *H04N 5/2257* (2013.01); *H04N 5/2328* (2013.01); *H04N 5/23248* (2013.01); *G03B 2205/0069* (2013.01)

(58) Field of Classification Search
USPC .......................................................... 348/357
See application file for complete search history.

(56) References Cited

U.S. PATENT DOCUMENTS

| | | | | |
|---|---|---|---|---|
| 7,613,384 B2 * | 11/2009 | Seo | ......................... | G11B 27/11 386/239 |
| 8,295,695 B2 * | 10/2012 | Yoshida | ................... | G02B 7/08 359/824 |
| 2011/0159919 A1 * | 6/2011 | Kim | ......................... | G02B 7/08 455/556.1 |
| 2012/0236167 A1 * | 9/2012 | Takano | .................. | H05K 1/147 348/208.2 |
| 2013/0128108 A1 * | 5/2013 | Oh | ....................... | H04N 5/2253 348/374 |
| 2013/0136438 A1 * | 5/2013 | Lee | .......................... | G03B 3/10 396/133 |

* cited by examiner

*Primary Examiner* — Sinh Tran
*Assistant Examiner* — Mark Monk
(74) *Attorney, Agent, or Firm* — Li & Cai Intellectual Property (USA) Office

(57) ABSTRACT

An image capturing module for reducing assembly tilt includes an image sensing unit, a housing frame and an actuator structure. The image sensing unit includes a carrier substrate and an image sensing chip disposed on the carrier substrate and electrically connected to the carrier substrate. The housing frame is disposed on the carrier substrate to surround the image sensing chip and downwardly contacts the image sensing chip. The actuator structure is disposed on the housing frame and above the image sensing chip. The actuator structure includes a lens holder disposed on the housing frame and a lens assembly disposed inside the lens holder and downwardly contacting the housing frame. Whereby, the image sensing chip, the housing frame and the lens assembly are sequentially stacked on top of one another for reducing the assembly tilt of the lens assembly relative to the image sensing chip.

10 Claims, 3 Drawing Sheets

IMAGE CAPTURING MODULE FOR REDUCING ASSEMBLY TILT

BACKGROUND OF THE INVENTION

1. Field of the Invention

The instant disclosure relates to an image capturing module, and more particularly to an image capturing module for reducing assembly tilt.

2. Description of Related Art

Recently, it has become more and more popular for portable devices such as mobile phones or PDA to be equipped with an imaging module. Furthermore, since the market requires these portable devices to have more powerful functions and smaller sizes, it is necessary for the imaging module to generate high quality pictures and to be of small size accordingly. One improvement of picture quality is to increase the number of pixels. The pixel number of an imaging module has already increased from the VGA-level 30 pixels to 2, 3 or even 8 million pixels, which is now common in the market. Another improvement lies in the definition of the image. Thus, the imaging module of a portable device also develops from a fixed-focus mode to auto-focus mode or even optical zoom mode.

The auto-focus mode employs the principle of moving the lens in the imaging module suitably according to various distances of targets, whereby the optical image of the desired target can be focused correctly on an image sensor so as to generate a clear image. The common ways of activating the lens to move in the imaging module include activating by a stepping motor, piezoelectric motor and voice coil motor (VCM). However, both the image sensor and the sensor holder are disposed on the same stacked datum plane of the circuit board, thus the assembly tilt angle of the sensor holder relative to the image sensor is increased to decrease the image quality provided by the imaging module.

SUMMARY OF THE INVENTION

One aspect of the instant disclosure relates to an image capturing module for reducing assembly tilt.

One of the embodiments of the instant disclosure provides an image capturing module for reducing assembly tilt, comprising: an image sensing unit, a housing frame and an actuator structure. The image sensing unit includes a carrier substrate and an image sensing chip disposed on the carrier substrate and electrically connected to the carrier substrate. The housing frame is disposed on the carrier substrate and downwardly contacting the image sensing chip, wherein the image sensing chip is surrounded by the housing frame. The actuator structure is disposed on the housing frame and above the image sensing chip, wherein the actuator structure includes a lens holder disposed on the housing frame and a lens assembly disposed inside the lens holder and downwardly contacting the housing frame. Whereby, the image sensing chip, the housing frame and the lens assembly are sequentially stacked on top of one another for reducing the assembly tilt of the lens assembly relative to the image sensing chip.

Another one of the embodiments of the instant disclosure provides an image capturing module for reducing assembly tilt, comprising: an image sensing unit, a housing frame and an actuator structure. The image sensing unit including a carrier substrate and an image sensing chip disposed on the carrier substrate and electrically connected to the carrier substrate. The housing frame is disposed on the carrier substrate and downwardly contacting the image sensing chip, wherein the image sensing chip is surrounded by the housing frame. The actuator structure is disposed on the housing frame and above the image sensing chip, wherein the actuator structure includes a lens holder disposed on the housing frame and a lens assembly movably disposed inside the lens holder and downwardly contacting the housing frame, the lens holder includes a surrounding movable member movably disposed therein, the lens assembly is fixed inside the surrounding movable member through bonding glue, and the lens assembly is movably disposed inside the lens holder through the surrounding movable member. Whereby, the image sensing chip, the housing frame and the lens assembly are sequentially stacked on top of one another for reducing the assembly tilt of the lens assembly relative to the image sensing chip.

Yet another one of the embodiments of the instant disclosure provides an image capturing module for reducing assembly tilt, comprising: an image sensing unit, a housing frame and an actuator structure. The image sensing unit including a carrier substrate and an image sensing chip disposed on the carrier substrate and electrically connected to the carrier substrate, wherein the image sensing chip has a first stacked base level on the top side thereof. The housing frame is disposed on the carrier substrate and surrounding the image sensing chip, wherein the housing frame has a surrounding support portion disposed on the carrier substrate through first adhesive glue, a surrounding contact portion disposed on the image sensing chip to directly contact the first stacked base level of the image sensing chip, and a surrounding connection portion connected between the surrounding support portion and the surrounding contact portion, and the surrounding connection portion of the housing frame has a second stacked base level on the top side thereof. The actuator structure is disposed on the housing frame and above the image sensing chip, wherein the actuator structure includes a lens holder disposed on the housing frame through second adhesive glue and a lens assembly disposed inside the lens holder, and the lens assembly is disposed on the surrounding connection portion to directly contact the second stacked base level of the surrounding connection portion.

Therefore, because the image sensing chip, the housing frame and the lens assembly are sequentially stacked on top of one another, the first assembly tilt angle of the second stacked base level relative to the first stacked base level is very close to or substantially equal to the second assembly tilt angle of the assembly base level relative to the first stacked base level or relative to the second stacked base level of the surrounding connection portion. Hence, the assembly tilt of the assembly base level of the lens assembly relative to the first stacked base level of the image sensing chip can be decreased for ensuring the flatness of the lens assembly relative to the image sensing chip.

To further understand the techniques, means and effects of the instant disclosure applied for achieving the prescribed objectives, the following detailed descriptions and appended drawings are hereby referred, such that, through which, the purposes, features and aspects of the instant disclosure can be thoroughly and concretely appreciated. However, the appended drawings are provided solely for reference and illustration, without any intention to limit the instant disclosure.

DETAILED DESCRIPTION OF THE PREFERRED EMBODIMENTS

The embodiments of "an image capturing module for reducing assembly tilt" of the instant disclosure are described. Other advantages and objectives of the instant disclosure can be easily understood by one skilled in the art from the disclosure. The instant disclosure can be applied in different embodiments. Various modifications and variations can be made to various details in the description for different applications without departing from the scope of the instant disclosure. The drawings of the instant disclosure are provided only for simple illustrations, but are not drawn to scale and do not reflect the actual relative dimensions. The following embodiments are provided to describe in detail the concept of the instant disclosure, and are not intended to limit the scope thereof in any way.

Figure 1:
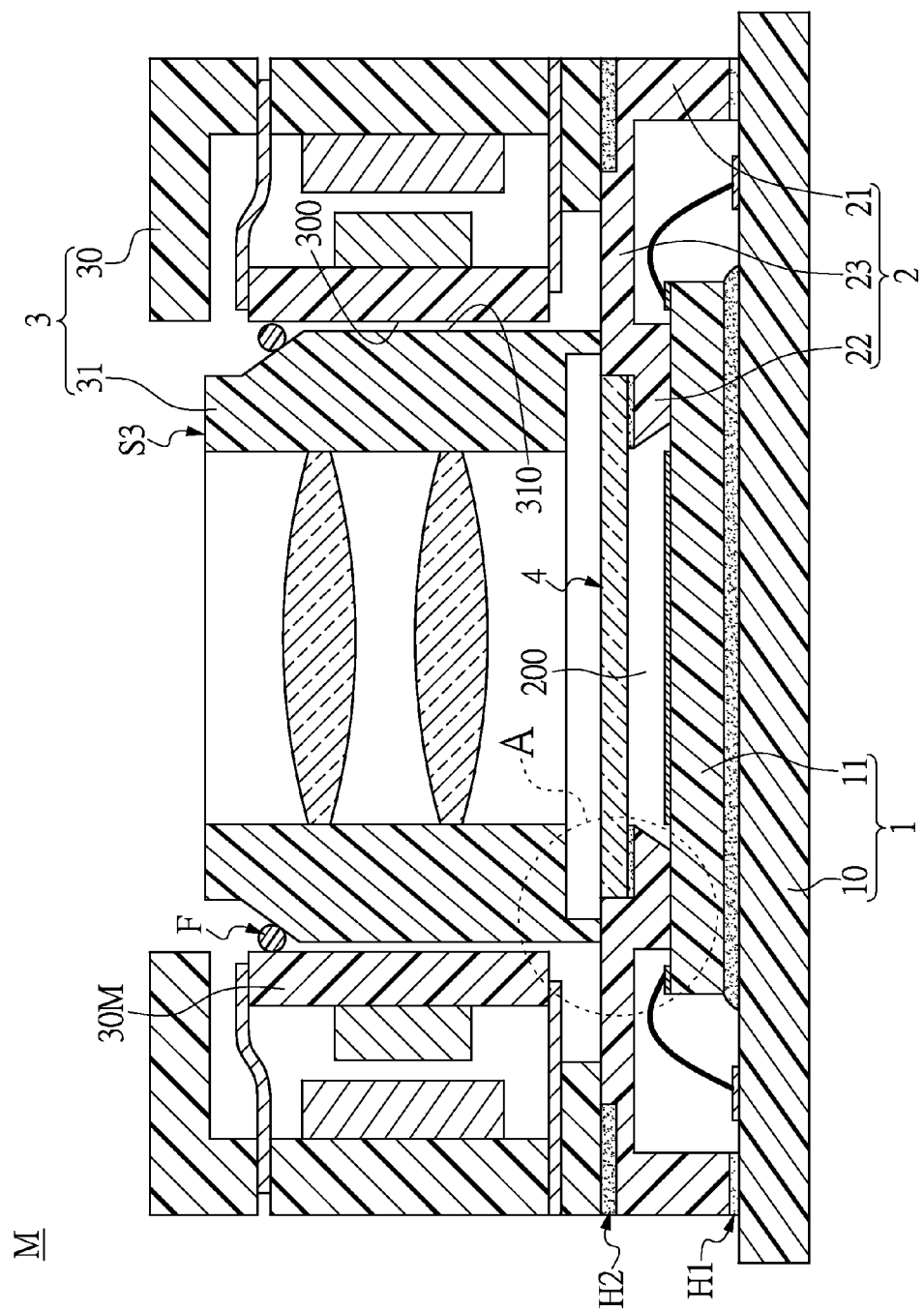
FIG. 1 shows a lateral, cross-sectional, schematic view of the image capturing module using a voice coil according to the instant disclosure.
Figure 2:
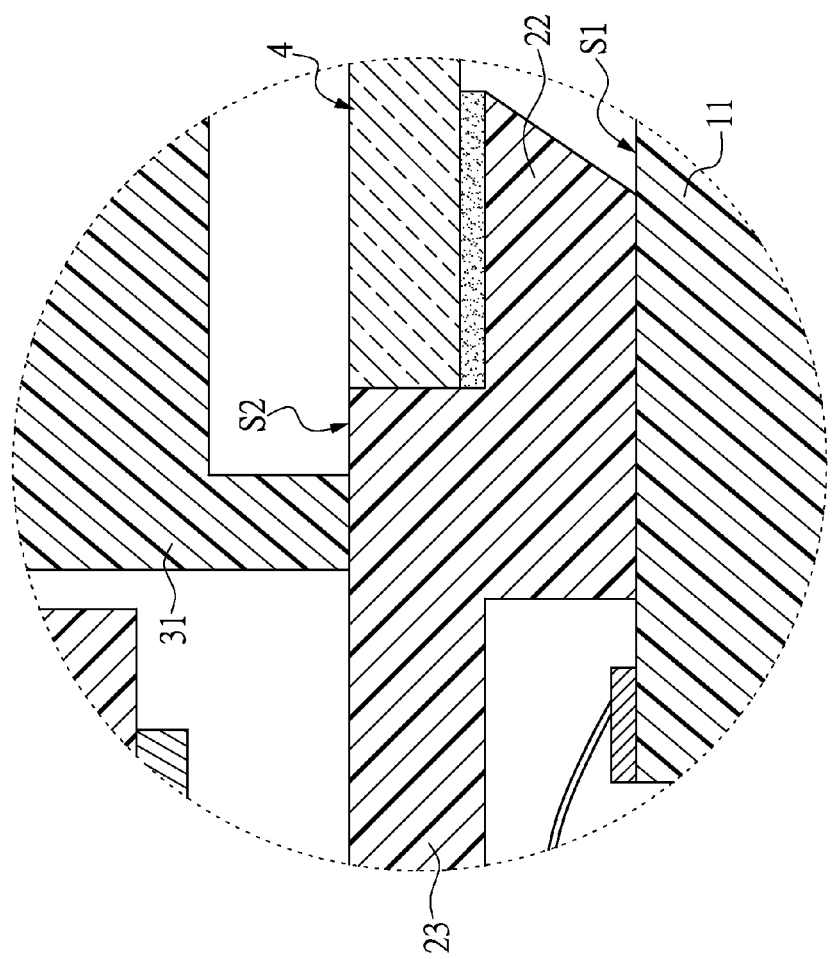
FIG. 2 shows an enlarged view taken on part A of FIG. 1.

Referring to FIG. 1 and FIG. 2, FIG. 2 shows an enlarged view taken on part A of FIG. 1. The instant disclosure provides an image capturing module M for reducing assembly tilt, comprising: an image sensing unit 1, a housing frame 2 and an actuator structure 3.

First, as shown in FIG. 1, the image sensing unit 1 includes a carrier substrate 10 (or a carrying substrate) and an image sensing chip 11 disposed on the carrier substrate 10 and electrically connected to the carrier substrate 10. For example, the image sensing chip 11 may be a CMOS (Complementary Metal-Oxide-Semiconductor) image sensing chip, and the image sensing chip 11 can be adhesively disposed on the carrier substrate 10 through any type of adhesive material (not labeled) such as UV adhesive glue, thermosetting glue or curing glue applied to oven etc. In addition, the carrier substrate 10 may be a circuit substrate having a plurality of conductive pads (not labeled) disposed on the top surface of the circuit substrate, and the image sensing chip 11 has a plurality of conductive pads (not labeled) disposed on the top surface of the image sensing chip 11. Each conductive pad (not labeled) of the image sensing chip 11 can be electrically connected to the corresponding conductive pad (not labeled) of the carrier substrate 10 through a corresponding conductive wire (not labeled), thus the image sensing chip 11 can be electrically connected with the carrier substrate 10 through the conductive wires (not labeled).

Moreover, as shown in FIG. 1, the housing frame 2 is disposed on the carrier substrate 10 and downwardly contacting the image sensing chip 11 (i.e., the bottom side of the housing frame 2 is substantially flush with the top side of the image sensing chip 11), and the image sensing chip 11 is surrounded by the housing frame 2. The actuator structure 3 is disposed on the housing frame 2 and above the image sensing chip 11, and the actuator structure 3 includes a lens holder 30 disposed on the housing frame 2 and a lens assembly 31 disposed inside the lens holder 30 and downwardly contacting the housing frame 2 (i.e., the bottom side of the lens assembly 31 is substantially flush with the top side of the housing frame 2). For example, the housing frame 2 can be adhesively disposed on the carrier substrate 10 through first adhesive glue H1 such as UV adhesive glue, thermosetting glue or curing glue applied to oven etc., and the lens holder 30 also can be adhesively disposed on the housing frame 2 through second adhesive material H2 such as UV adhesive glue, thermosetting glue or curing glue applied to oven etc, and the lens assembly 31 may be composed of a base (not labeled) and a plurality of optical lenses (not labeled).

Figure 3:
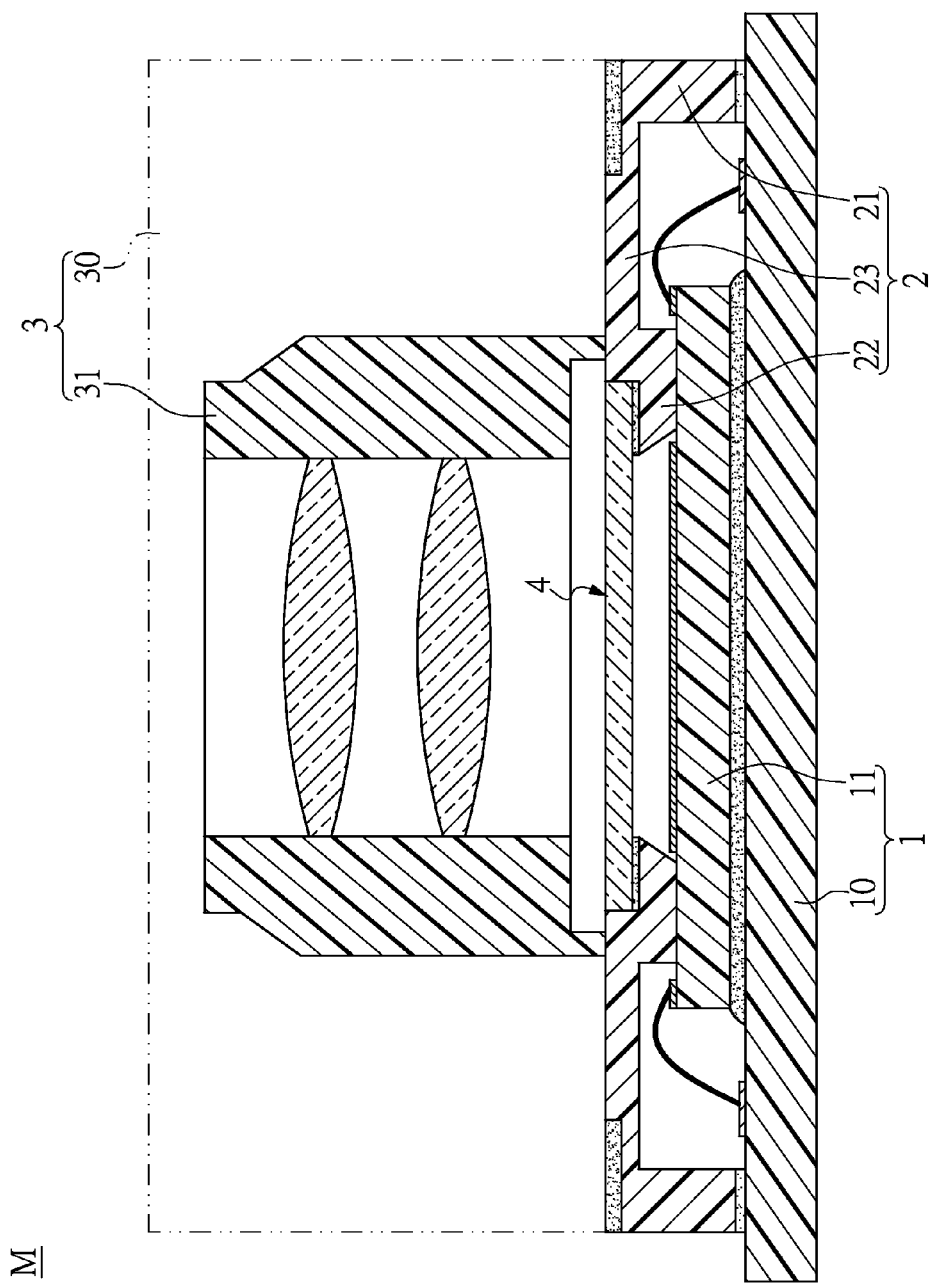
FIG. 3 shows a lateral, cross-sectional, schematic view of the image capturing module using another voice coil according to the instant disclosure.

It is worth mentioning that, as shown in FIG. 1, the actuator structure 3 may be a voice coil motor actuator, but the voice coil motor actuator used in the first embodiment is merely an example and is not meant to limit the instant disclosure (as shown in FIG. 3). If the actuator structure 3 is a voice coil motor actuator, the actuator structure 3 includes a lens assembly 31 movably disposed inside the lens holder 30 and downwardly contacting the housing frame 2 (i.e., the bottom side of the lens assembly 31 is substantially flush with the top side of the housing frame 2), wherein the lens holder 30 includes a surrounding movable member 30M movably disposed therein, the lens assembly 31 is fixed inside the surrounding movable member 30M through bonding glue F, and the lens assembly 31 is movably disposed inside the lens holder 30 through the surrounding movable member 30M. For example, the lens holder 30 or the surrounding movable member 30M has an inner surrounding threadless surface 300, and the lens assembly 31 has an outer perimeter threadless surface 310 corresponding to the inner surrounding threadless surface 300 and mated with the inner surrounding threadless surface 300.

Furthermore, the image capturing module M further comprises an optical filter 4 disposed on the housing frame 2 and between the image sensing chip 11 and the lens assembly 31. In addition, the housing frame 2 has a top opening 200 disposed on the top side thereof and between the image sensing chip 11 and the lens assembly 31, and the top opening 200 of the housing frame 2 is enclosed by the optical filter 4. For example, the optical filter 4 may be a flat glass plate having an infrared (IR) coated layer and/or an antireflection (AR) coating layer, and the optical filter 4 can be fixed inside a concave space (not labeled) of the housing frame 2 through adhesive glue (not labeled).

More precisely, referring to FIG. 1 and FIG. 2, the image sensing chip 11 has a first stacked (alignment) base level S1 on the top side thereof. The housing frame 2 has a surrounding support portion 21 disposed on the carrier substrate 10 through first adhesive glue H1, a surrounding contact portion 22 disposed on the image sensing chip 11 to directly contact the first stacked base level S1 of the image sensing chip 11, and a surrounding connection portion 23 connected between the surrounding support portion 21 and the surrounding contact portion 22, and the surrounding connection portion 23 of the housing frame 2 has a second stacked base level S2 on the top side thereof. Whereby, the optical filter 4 can be disposed on the surrounding contact portion 22 and surrounded by the surrounding connection portion 23, the lens holder 30 can be disposed on the surrounding connection portion 23 of the housing frame 2 through second adhesive glue H2, and the lens assembly 31 can be disposed on the surrounding connection portion 23 to directly contact the second stacked base level S2 of the surrounding connection portion 23.

More precisely, referring to FIG. 1 and FIG. 2, the surrounding contact portion 22 of the housing frame 2 is disposed on the first stacked base level S1 of the image sensing chip 11, so as to obtain a first assembly tilt angle of the second stacked base level S2 of the surrounding connection portion 23 relative to the first stacked base level S1 of the image sensing chip 11. The lens assembly 31 is disposed on the second stacked base level S2 of the surrounding connection portion 23, so as to obtain a second assembly tilt angle of an assembly base level S3 of the lens assembly 31 relative to the first stacked base level S1 of the image sensing chip 11, and the assembly base level S3 may be on the top surface or the bottom surface of the lens assembly 31. Whereby, the first assembly tilt angle of the second stacked base level S2 of the surrounding connection portion 23 relative to the first stacked base level S1 of the image sensing chip 11 is very close to or substantially the same as the second assembly tilt angle of the assembly base level S3 of the lens assembly 31 relative to the first stacked base level S1 of the image sensing chip 11 or relative to the second stacked base level S2 of the surrounding connection portion 23, thus the assembly tilt of the lens assembly 31 relative to the image sensing chip 11 can be reduced. In other words, when the image sensing chip 11, the housing frame 2 and the lens assembly 31 are sequentially stacked on top of one another, the first assembly tilt angle of the second stacked base level S2 relative to the first stacked base level S1 is very close to or substantially equal to the second assembly tilt angle of the assembly base level S3 relative to the first stacked base level S1 or the second stacked base level S2, thus the assembly tilt of the assembly base level S3 of the lens assembly 31 relative to the first stacked base level S1 of the image sensing chip 11 can be decreased.

In conclusion, because the image sensing chip 11, the housing frame 2 and the lens assembly 31 are sequentially stacked on top of one another, the first assembly tilt angle of the second stacked base level S2 relative to the first stacked base level S1 is very close to or substantially equal to the second assembly tilt angle of the assembly base level S3 relative to the first stacked base level S1 or relative to the second stacked base level S2 of the surrounding connection portion 23. Hence, the assembly tilt of the assembly base level S3 of the lens assembly 31 relative to the first stacked base level S1 of the image sensing chip 11 can be decreased for ensuring the flatness of the lens assembly 31 relative to the image sensing chip 11.

The aforementioned descriptions merely represent the preferred embodiments of the instant disclosure, without any intention to limit the scope of the instant disclosure which is fully described only within the following claims. Various equivalent changes, alterations or modifications based on the claims of instant disclosure are all, consequently, viewed as being embraced by the scope of the instant disclosure.

What is claimed is:

1. An image capturing module for reducing assembly tilt, comprising:
    an image sensing unit including a carrier substrate and an image sensing chip disposed on the carrier substrate and electrically connected to the carrier substrate;
    a housing frame disposed on the carrier substrate and downwardly contacting the image sensing chip, wherein the image sensing chip is surrounded by the housing frame; and
    an actuator structure disposed on the housing frame and above the image sensing chip, wherein the actuator structure includes a lens holder disposed on the housing frame and a lens assembly disposed inside the lens holder and downwardly contacting the housing frame;
    wherein the image sensing chip, the housing frame and the lens assembly are sequentially stacked on top of one another for reducing the assembly tilt of the lens assembly relative to the image sensing chip.

2. The image capturing module of claim 1, further comprising: an optical filter disposed on the housing frame and between the image sensing chip and the lens assembly, wherein the housing frame has a top opening disposed on the top side thereof and between the image sensing chip and the lens assembly, and the top opening of the housing frame is enclosed by the optical filter, wherein the lens holder has an inner surrounding threadless surface, and the lens assembly has an outer perimeter threadless surface corresponding to the inner surrounding threadless surface.

3. The image capturing module of claim 2, wherein the image sensing chip has a first stacked base level on the top side thereof, the housing frame has a surrounding support portion disposed on the carrier substrate through first adhesive glue, a surrounding contact portion disposed on the image sensing chip to directly contact the first stacked base level of the image sensing chip, and a surrounding connection portion connected between the surrounding support portion and the surrounding contact portion, and the surrounding connection portion of the housing frame has a second stacked base level on the top side thereof, wherein the optical filter is disposed on the surrounding contact portion and surrounded by the surrounding connection portion, the lens holder is disposed on the surrounding connection portion of the housing frame through second adhesive glue, and the lens assembly is disposed on the surrounding connection portion to directly contact the second stacked base level of the surrounding connection portion.

4. The image capturing module of claim 3, wherein the surrounding contact portion of the housing frame is disposed on the first stacked base level of the image sensing chip, for obtaining a first assembly tilt angle of the second stacked base level of the surrounding connection portion relative to the first stacked base level of the image sensing chip, wherein the lens assembly is disposed on the second stacked base level of the surrounding connection portion, for obtaining a second assembly tilt angle of an assembly base level of the lens assembly relative to the first stacked base level of the image sensing chip, wherein the first assembly tilt angle of the second stacked base level of the surrounding connection portion relative to the first stacked base level of the image sensing chip is close to or the same as the second assembly tilt angle of the assembly base level of the lens assembly relative to the second stacked base level of the surrounding connection portion.

5. An image capturing module for reducing assembly tilt, comprising:
    an image sensing unit including a carrier substrate and an image sensing chip disposed on the carrier substrate and electrically connected to the carrier substrate;
    a housing frame disposed on the carrier substrate and downwardly contacting the image sensing chip, wherein the image sensing chip is surrounded by the housing frame; and
    an actuator structure disposed on the housing frame and above the image sensing chip, wherein the actuator structure includes a lens holder disposed on the housing frame and a lens assembly movably disposed inside the lens holder and downwardly contacting the housing frame, the lens holder includes a surrounding movable member movably disposed therein, the lens assembly is fixed inside the surrounding movable member through bonding glue, and the lens assembly is movably disposed inside the lens holder through the surrounding movable member;
    wherein the image sensing chip, the housing frame and the lens assembly are sequentially stacked on top of one another for reducing the assembly tilt of the lens assembly relative to the image sensing chip.

6. The image capturing module of claim 5, further comprising: an optical filter disposed on the housing frame and between the image sensing chip and the lens assembly, wherein the housing frame has a top opening disposed on the top side thereof and between the image sensing chip and the lens assembly, and the top opening of the housing frame is enclosed by the optical filter, wherein the surrounding movable member of the lens holder has an inner surrounding threadless surface, and the lens assembly has an outer perimeter threadless surface corresponding to the inner surrounding threadless surface.

7. The image capturing module of claim 6, wherein the image sensing chip has a first stacked base level on the top side thereof, the housing frame has a surrounding support portion disposed on the carrier substrate through first adhesive glue, a surrounding contact portion disposed on the image sensing chip to directly contact the first stacked base level of the image sensing chip, and a surrounding connection portion connected between the surrounding support portion and the surrounding contact portion, and the surrounding connection portion of the housing frame has a second stacked base level on the top side thereof, wherein the optical filter is disposed on the surrounding contact portion and surrounded by the surrounding connection portion, the lens holder is disposed on the surrounding connection portion of the housing frame through second adhesive glue, and the lens assembly is disposed on the surrounding connection portion to directly contact the second stacked base level of the surrounding connection portion.

8. The image capturing module of claim 7, wherein the surrounding contact portion of the housing frame is disposed on the first stacked base level of the image sensing chip, for obtaining a first assembly tilt angle of the second stacked base level of the surrounding connection portion relative to the first stacked base level of the image sensing chip, wherein the lens assembly is disposed on the second stacked base level of the surrounding connection portion, for obtaining a second assembly tilt angle of an assembly base level of the lens assembly relative to the first stacked base level of the image sensing chip, wherein the first assembly tilt angle of the second stacked base level of the surrounding connection portion relative to the first stacked base level of the image sensing chip is close to or the same as the second assembly tilt angle of the assembly base level of the lens assembly relative to the second stacked base level of the surrounding connection portion.

9. An image capturing module for reducing assembly tilt, comprising:

an image sensing unit including a carrier substrate and an image sensing chip disposed on the carrier substrate and electrically connected to the carrier substrate, wherein the image sensing chip has a first stacked base level on the top side thereof;

a housing frame disposed on the carrier substrate and surrounding the image sensing chip, wherein the housing frame has a surrounding support portion disposed on the carrier substrate through first adhesive glue, a surrounding contact portion disposed on the image sensing chip to directly contact the first stacked base level of the image sensing chip, and a surrounding connection portion connected between the surrounding support portion and the surrounding contact portion, and the surrounding connection portion of the housing frame has a second stacked base level on the top side thereof; and an actuator structure disposed on the housing frame and above the image sensing chip, wherein the actuator structure includes a lens holder disposed on the housing frame through second adhesive glue and a lens assembly disposed inside the lens holder, and the lens assembly is disposed on the surrounding connection portion to directly contact the second stacked base level of the surrounding connection portion.

10. The image capturing module of claim 9, wherein the surrounding contact portion of the housing frame is disposed on the first stacked base level of the image sensing chip, for obtaining a first assembly tilt angle of the second stacked base level of the surrounding connection portion relative to the first stacked base level of the image sensing chip, wherein the lens assembly is disposed on the second stacked base level of the surrounding connection portion, for obtaining a second assembly tilt angle of an assembly base level of the lens assembly relative to the first stacked base level of the image sensing chip, wherein the first assembly tilt angle of the second stacked base level of the surrounding connection portion relative to the first stacked base level of the image sensing chip is close to or the same as the second assembly tilt angle of the assembly base level of the lens assembly relative to the second stacked base level of the surrounding connection portion, for reducing the assembly tilt of the lens assembly relative to the image sensing chip.

* * * * *